United States Patent

Chan et al.

[11] Patent Number: 6,138,096
[45] Date of Patent: *Oct. 24, 2000

[54] APPARATUS FOR SPEECH-BASED GENERATION, AUDIO TRANSLATION, AND MANIPULATION OF TEXT MESSAGES OVER VOICE LINES

[75] Inventors: Colin Kum Lok Chan; Khai Pang Tan, both of Singapore, Singapore

[73] Assignee: Add Value Holdings Pte Ltd., Singapore

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,096

[22] Filed: Mar. 18, 1997

[30] Foreign Application Priority Data

Nov. 26, 1996 [SG] Singapore .............................. 9611443

[51] Int. Cl.⁷ .................................................. G10L 15/04
[52] U.S. Cl. ........................................ 704/235; 704/200
[58] Field of Search .................................. 704/235, 277, 704/200

[56] References Cited

U.S. PATENT DOCUMENTS

| | | |
|---|---|---|
| 4,473,904 | 9/1984 | Suehiro et al. . |
| 4,489,433 | 12/1984 | Suehiro et al. . |
| 4,837,798 | 6/1989 | Cohen et al. ............................. 379/88 |
| 4,916,726 | 4/1990 | Morley, Jr. et al. . |
| 4,972,462 | 11/1990 | Shibata . |
| 4,975,957 | 12/1990 | Ichikawa et al. . |
| 4,996,707 | 2/1991 | O'Malley et al. . |
| 5,168,548 | 12/1992 | Kaufman et al. ....................... 704/200 |
| 5,475,738 | 12/1995 | Penzias . |
| 5,479,411 | 12/1995 | Klein . |
| 5,497,373 | 3/1996 | Hulen et al. . |
| 5,675,507 | 10/1997 | Bobo, II ............................. 395/200.36 |
| 5,740,231 | 4/1998 | Cohn et al. ............................... 379/89 |

FOREIGN PATENT DOCUMENTS

| | | |
|---|---|---|
| 309993 | 4/1989 | European Pat. Off. . |
| 339467 | 11/1989 | European Pat. Off. . |
| 339476 | 11/1989 | European Pat. Off. . |
| 532209 | 3/1993 | European Pat. Off. . |
| 565850 | 10/1993 | European Pat. Off. . |
| 586953 | 3/1994 | European Pat. Off. . |
| 586954 | 3/1994 | European Pat. Off. . |
| 631419 | 12/1994 | European Pat. Off. . |
| 644680 | 3/1995 | European Pat. Off. . |
| 650284 | 4/1995 | European Pat. Off. . |
| 660575 | 6/1995 | European Pat. Off. . |
| 662763 | 7/1995 | European Pat. Off. . |
| 0695071 | 1/1996 | European Pat. Off. . |
| 712131 | 5/1996 | European Pat. Off. . |
| 3162088 | 7/1991 | Japan . |
| 4175046 | 6/1992 | Japan . |
| 4175049 | 6/1992 | Japan . |
| 4213943 | 8/1992 | Japan . |
| 7162453 | 6/1995 | Japan . |
| 2217953 | 11/1989 | United Kingdom . |
| 8707801 | 12/1987 | WIPO . |
| 9003700 | 4/1990 | WIPO . |
| 9609714 | 3/1996 | WIPO . |
| 9620553 | 7/1996 | WIPO . |

OTHER PUBLICATIONS

An English language abstract of EP 339,467.
An English language abstract of EP 339,476.
An English language abstract of EP 644,680.
An English language abstract of EP 712,131.
An English Language abstract of JP 3–162088.
An English Language abstract of JP 4–175046.
An English language abstract of JP 4–175049.
An English language abstract of JP 4–213943.
An English language abstract of JP 7–162453.

Primary Examiner—David R. Hudspeth
Assistant Examiner—Harold Zintel
Attorney, Agent, or Firm—Greenblum & Bernstein, P.L.C.

[57] ABSTRACT

Signal processing apparatus for providing a conversion of audio and E-mail signals received from a network interface 13 and for supplying the signals either to an audio reception device 80 in the form of a telephone handset or to a video reception in the form of a video processor 8 for display on a television set 9 and, selectively, for converting the received signals for reception on the other reception device.

30 Claims, 3 Drawing Sheets

APPARATUS FOR SPEECH-BASED GENERATION, AUDIO TRANSLATION, AND MANIPULATION OF TEXT MESSAGES OVER VOICE LINES

BACKGROUND AND FIELD OF THE INVENTION

The present invention relates to signal processing apparatus, more particularly but not exclusively to apparatus for providing access to telephone and internet systems.

Telephony apparatus and apparatus for providing access to the internet and more particularly E-mail services are well-known, telephony services being able to provide an interchange of information orally/aurally whereas E-mail services provide a means for interchanging information visibly.

It is an inherent disadvantage of telephony and E-mail systems that they lack flexibility in terms of the medium of expression and accordingly it is an object of the invention to provide apparatus which may be used to give greater flexibility in the use of such communication systems.

SUMMARY OF THE INVENTION

According to the invention in a first aspect, there is provided a processing apparatus comprising means of processing data received from a network link; means for conversion of data from text to speech format and vice versa; means for processing the data or the converted data for aural reception; means for processing the data or the converted data for visual reception; control means for selecting a reception mode for the data and instructing conversion of the data if the data is in an incorrect format.

Preferably the processing apparatus further includes apparatus for aural reception and transmission of the data which may be portable and may comprise a keypad for generating telephone and appliance control signals, a speaker for aural output and a microphone for oral input. Most preferably, the oral reception and transmission apparatus is in the form of a telephone handset using a cordless radio frequency link.

Preferably the network link of the processing apparatus is a link to a telephone network.

According to the invention in a second aspect, there is provided signal processing apparatus comprising means for processing data received from a network link; means for conversion of data from a text format to a speech format and vice versa; means for connection to an audio transceiver; means for connection to a video receiver; means for connection to a text input device; control means for selectively instructing conversion of the signal by the data conversion means and instructing output of the signal or the converted signal to the respective audio or video receiver connection means.

Preferably the signal processing apparatus further comprises means for connection to a text input device and the data processing means is further for processing a data transmission signal to be transmitted over the network link and the control means is further for receiving an audio input signal from the audio transceiver connection means or a text input signal from the text input device connection means, selectively converting the input signal to a text or audio signal and transmitting the input signal or the converted input signal to the data processing means for transmission over the network link to a pre-determined destination.

The signal processing apparatus may further comprise an audio transceiver which may be in the form of a telephone handset.

The data processing means may comprise internet connection means for transmitting, receiving and processing E-mail messages and the video receiver connection means may comprise a video processor connected to the data processing means for processing the E-mail messages for video display.

The data conversion means may comprise a text to speech processor and a speech to text processor and may include a modem for connection to the telephone network.

The signal processing apparatus preferably further comprises digital message storing means for storing an aural message and the control means may further be for instructing output of the message as an audio signal to the data processing means for transmission over the network link. The stored message may be a pre-recorded message or the control means may further be for instructing selective conversion and storage of the data signal as the message.

The signal processing apparatus may further be for instructing selective conversion and storage of the data signal as a text signal and subsequently instructing output of the text signal to the data processing means for transmission over the network link to a pre-determined destination.

According to the invention in a third aspect, there is provided signal processing apparatus comprising: signal processing means comprising means for connection to an audio transceiver; means for connection to a text input device; means to conversion of an audio signal to a text signal and vice versa; data processing means for processing a data transmission signal to be transmitted over the network link and; control means for receiving an audio input signal from the audio transceiver connection means or a text input signal from the text input device connection means, selectively converting the input signal to a text or audio signal and transmitting the input signal or the converted input signal to the data processing means for transmission over the network link to a predetermined destination.

BRIEF DESCRIPTION OF THE DRAWINGS

An embodiment of the invention will now be described, by way of example, with reference to the accompanying drawings in which.

DETAILED DESCRIPTION OF THE PREFERRED EMBODIMENT

Figure 1:
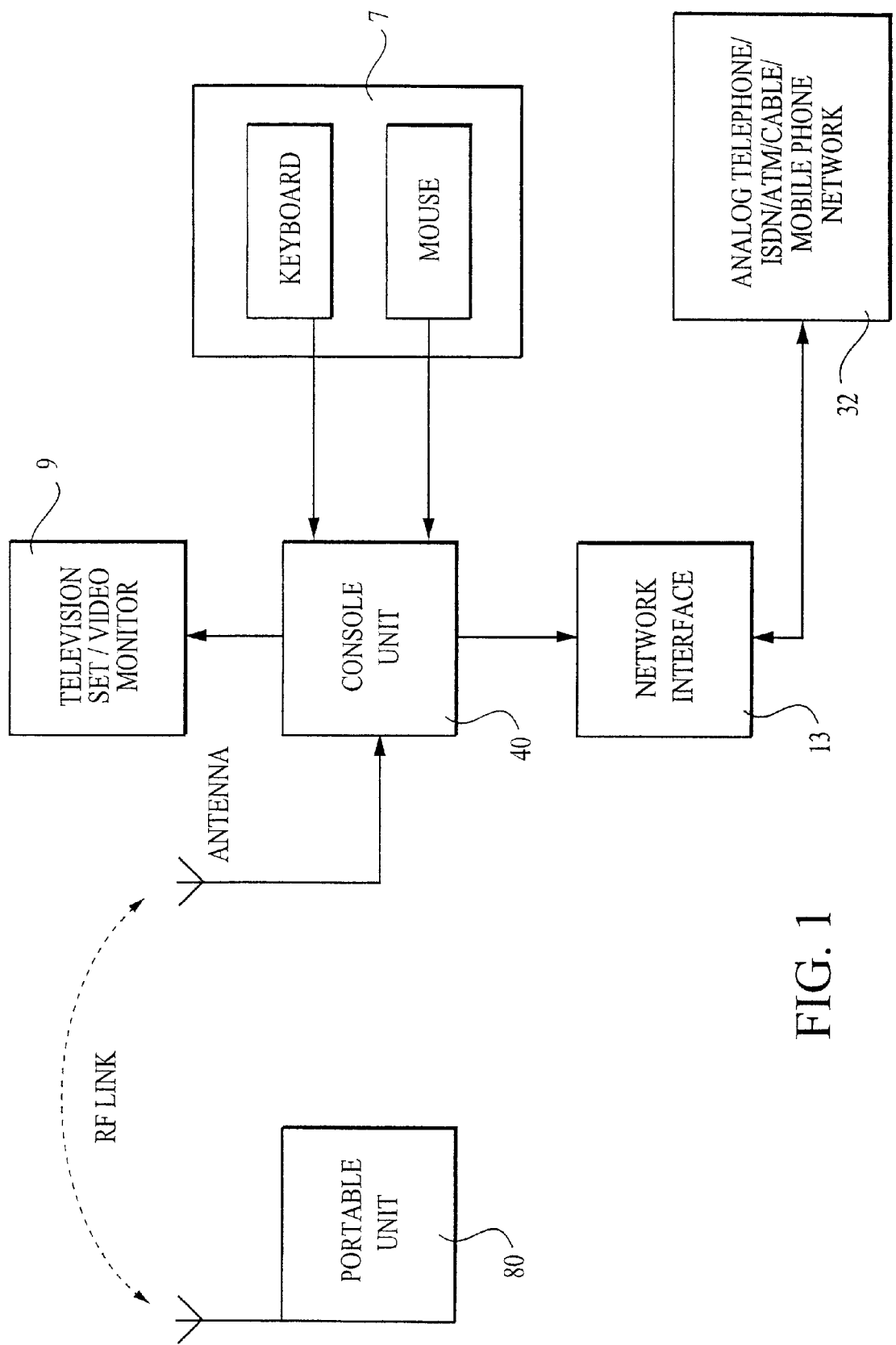
FIG. 1 is a block diagram of an embodiment of signal processing apparatus of the invention showing transfer of data and control signals between a network, a console unit, a portable unit, a television, a keyboard and a mouse.

In FIG. 1, a console unit 40 communicates with a portable unit 80. The console unit 40 has a protective housing (not shown) but the portable unit 80 is preferably in the external form of a multi-purpose telephone handset, for example as shown in U.S. Pat. No. 5,138,649.

Figure 2:
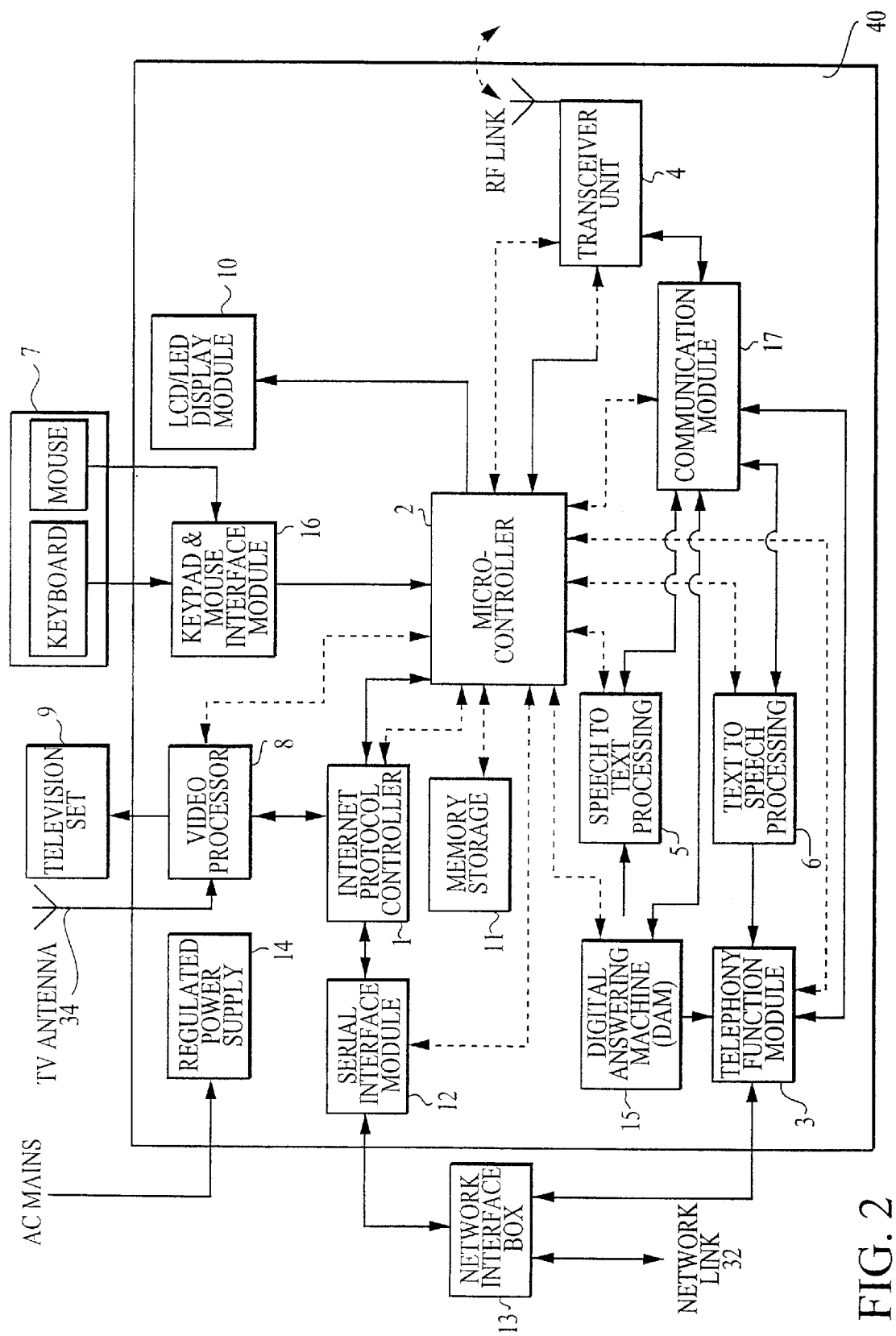
FIG. 2 is a block diagram showing the various components of the console unit.

The console unit 40, as depicted in FIG. 2, is provided by regulated power supply 14 and facilitates transfer of data and control signals to and from a generic network link 32. Data and control signals from the generic network link 32 are processed by an appropriate network interface box 13 before being received by the console unit 40 for processing. In a first preferred form, network link 32 is a link to a conventional telephone network and accordingly network interface box 13 represents a modem. The data received from network link 32 may contain information pertaining to E-mail messages or conventional telephone signals.

For E-mail transfer, in response to a user request or after predetermined time interval, the microcontroller 2 instructs dial-out to a remote server to perform the necessary steps to retrieve E-mail messages from the server in the conventional manner. The received messages are processed by serial interface module 12 in a conventional manner and sent to internet protocol controller 1 to be converted to text format. The E-mail data received by internet protocol controller 1 on conversion to text can, on instruction by microcontroller 2, be sent to text-to-speech processing module 6. Text-to-speech processing module 6 is a digital signal processor programmed with known techniques and converts the text containing the incoming E-mail message to analog or digitized speech. The incoming E-mail can, therefore, be in text format at the internet protocol controller 1 and/or analog/digitized speech format at the text-to-speech processing module 6.

Microcontroller 2 in console unit 40 is supported by memory storage 11. Memory storage 11 provides random access memory (RAM) for use by microcontroller 2 in a conventional manner. Memory storage 11 also provides firmware, through read-only memory (ROM), for operating microcontroller 2 and for processing data and signals received by console unit 40. Programs resident in memory storage 11 together with instructions from microcontroller 2 determine the format of the data, that is text or analog/digitized speech, and various alternatives for informing a user of the system, of incoming E-mail messages.

In a first alternative, the use can be informed of incoming E-mail messages by programming microcontroller 2 to instruct telephony function module 3, which establishes communication links with the telephone network via the modem, to dial-out a programmed telephone number at which the use may be contacted. Microcontroller 2 then instructs digital answering machine 15, which is capable of storing speech, to send a programmed speech message, via telephony function module 3 and network link 32, altering the user of incoming E-mail messages. Alternatively microcontroller 2 can instruct text-to-speech processing module 6 to convey the incoming E-mail message in analog speech format to the user via telephony function module 3 and network link 32.

In a second alternative, a user may program the microcontroller 2 to send incoming E-mail messages on conversion to text, to video processor 8 for further conversion to appropriate video signals for display on a conventional television set or video monitor 9. The user may then read the messages on the television set or video monitor 9 when convenient. The user may also instruct microcontroller 2 to store incoming E-mail messages in memory storage 11 in text format for later retrieval by the user on television set or video monitor 9.

In a third alternative, the user may be informed of incoming E-mail messages by programming microcontroller 2 to forward the messages to communication module 17. Communication module 17 modulates the incoming E-mail messages, in analog/digitized speech format, for transmission by transceiver unit 4 to portable unit 80.

Figure 3:
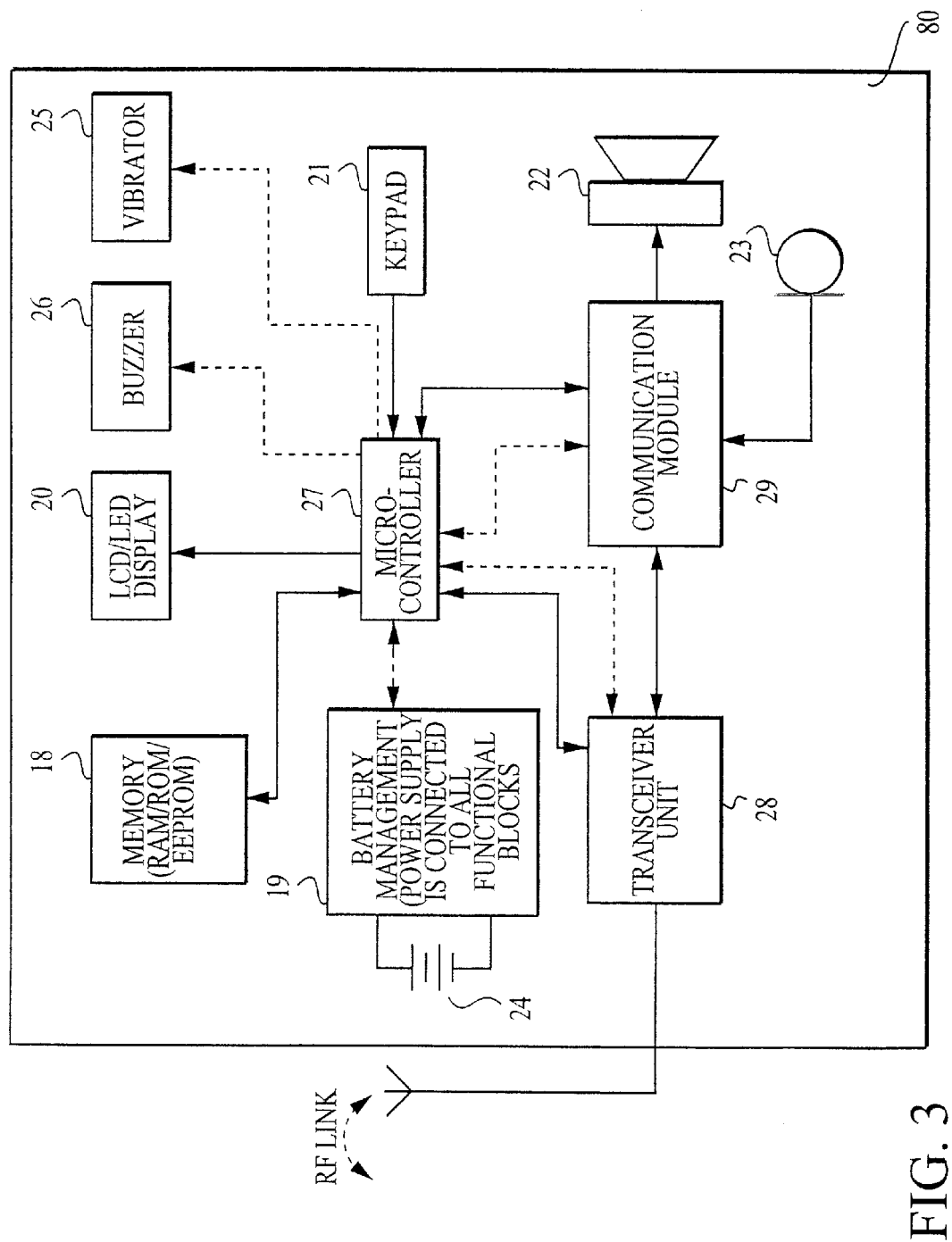
FIG. 3 is a block diagram showing the various components of the portable unit.

FIG. 3 depicts portable unit 80 which is powered by a battery 24 via battery management module 19. Transceiver unit 28 in the portable unit 80 receives the modulated analog/digitized speech containing the incoming E-mail messages and further processing is determined by microcontroller 27.

Microcontroller 27 is supported by memory 18 in a manner similar to microcontroller 2 and memory storage 11 in console unit 40. Microcontroller 27 can be programmed to instruct communication module 29 to demodulate the analog/digitized speech containing incoming E-mail messages. Communication module 29 then ensures that the speech containing the E-mail messages is in analog format before conveying it to the user through speaker 22.

Alternatively microcontroller 27 is programmed by the user to activate mechanical vibrator 25 and/or buzzer 26 to notify the user of incoming E-mail messages.

The user may also dictate spontaneously an E-mail message using portable unit 80 or a conventional telephone/mobile phone. If portable unit 80 is used for spontaneous dictation of an E-mail message, the outgoing E-mail message in spontaneous speech format is sent from microphone 23 to communication module 29 where it is modulated and transmitted to console unit 40 by transceiver unit 28. Transceiver unit 4 receives the modulated outgoing E-mail message and sends it to communication module 17 where it is demodulated and sent to digital answering machine 15 to be digitized and compressed. The compressed digitized speech containing the outgoing E-mail message is then sent to speech-to-text processing module 5 to be converted to text. Speech-to-text processing module is a digital signal processor programmed with known software, such as Dragon Dictate® for conversion of compressed digitized speech to text. On conversion to text, the outgoing E-mail message is sent out to the remote server via internet protocol controller 1, serial interface module 12 and the network link 32.

If a conventional telephone/mobile phone is used for dictation of an E-mail message by a remote user, the outgoing E-mail message, received as a telephone message in spontaneous speech format, is received by telephony function module 3 in console unit 40 through network link 32 and sent to digital answering machine 15 to be compressed and digitized. The compressed digitized speech containing the outgoing E-mail message is then converted to text by speech-to-text processing module 5 and sent out to the remote user via internet protocol controller 1, serial interface module 12 and network link 32, as before.

The actuation of keys on the keypad of a conventional telephone/mobile phone or keys on keypad 21 of portable unit 80, in a predetermined manner identifiable by microcontroller 2, sends control signals to console unit 40 to inform microcontroller 2 if the speech being sent is conventional telephone speech or speech containing an outgoing E-mail message to be suitably processed. In the case of an E-mail message, such keys also can send recipient identification information, such as an abbreviated dial code that the handset or the microcontroller 2 can look up in memory to determine the E-mail address or a handset which allows the alpha-numeric characters to be input from the keypad through alternative key functions may be used. A possible format for such a message would be:

# Dictated E-mail message # *Direct entry or memory recall of E-mail address* # Alternatively, dedicated function keys on keypad 21 in portable unit 80 may be actuated specifically to send control signals to console unit 40, to inform microcontroller 2 if the speech signals being sent is conventional telephone speech or speech containing an outgoing E-mail message to be suitably processed.

When the data received through network link 32 contains signals pertaining to conventional telephony, such as audio and control signals, telephony function module 3 establishes a communication link with network link 32 via network interface box 13 and informs microcontroller 2. Programs resident in memory storage 11 and instructions from microcontroller 2 then determine how the telephone signals are processed.

In a first alternative, a system user can be informed of incoming telephone calls by programming microcontroller 2 to instruct telephony function module 3, after receipt of an incoming call, to dial-out a programmed telephone number at which the user may be contacted. Digital answering machine 15 then sends a programmed speech message, via telephony function module 3 and network link 32, notifying the user of new telephone calls.

In a second alternative, the telephone signals may be relayed to the portable unit 80 held by the user, in the usual way. This is achieved by programming microcontroller 2 to instruct communication module 17 to modulate the telephone signals and send them to transceiver unit 4. The telephone signals are then transmitted by transceiver unit 4 to portable unit 80 where they are received by transceiver unit 28, sent to microcontroller 27 and demodulated by communication module 29. The user may then take the telephone call listening through speaker 22 and speaking through microphone 23, the speech signals being modulated by communication module 29 and transmitted to console unit 40 by transceiver unit 28.

Transceiver unit 4 in console unit 40 receives the telephone signals and sends them to communication module 17 for demodulation. The telephone signals are then sent out to network link 32 via telephony function module 3. Telephone control signals from keypad 21 may be sent in a similar way to initiate a call and send control instructions.

In a third alternative, a suer may program microcontroller 2 to instruct digital answering machine 15 to digitize and compress the incoming telephone message and sent this to microcontroller 2. Microcontroller 2 then forwards the compressed digitized speech signals to speech-to-text processing module 5 where they are converted to text before being stored in memory storage 11. The telephone message in text format is then retrieved from memory storage 11, converted to appropriate video signals by video processor 8 and may be read by the user on television set or video monitor 9.

Portable unit 80 can also be used as a remote control for television set 9. The keys on keypad 21 in portable unit 80 can be actuated to generate television control signals which are then sent by microcontroller 27 to console unit 40 upon modulation. Transceiver unit 4 in console unit 40 then receives the television control signals which are then demodulated by communication module 17 and forwarded to video processor 8 by microcontroller 2. The television set 9 is then controlled by the television control signals sent by video processor 8 which receives television signals from television antenna 34. Dedicated function keys on keypad 21 or a predetermined sequence of undedicated keys may be actuated to send control signals to console unit 40 to inform microcontroller 2 of arriving television signals to be suitably processed.

Console unit 40 and portable unit 80 are preferably equipped with liquid crystal display (LCD) screens/light emitting diodes (LEDs) 10 and 20 respectively which can be used to display information such as date, time and number of E-mail and telephone messages. Console unit 40 preferably also provides for a keypad and mouse interface module 16 which interfaces with keyboard and mouse unit 7. The keyboard and mouse may be used to instruct microcontroller 2 to set defaults for treatment of incoming and outgoing telephone and e-mail messages, as well as sending e-mail messages in a conventional manner.

The embodiment of the invention described is not to be construed as limitative. For example, although shown using a radio frequency communication link between console unit 40 and portable unit 80, the invention is equally of use with an infra-red or hard-wired communication link. Furthermore, network link 32 may be a Local Area Network (LAN) link and accordingly network interface box may be a suitable card such as an Ethernet® card and internet protocol controller may be replaced by an appropriate LAN protocol controller. As such it is to be understood that various modifications could be made to the embodiment described without departing from the scope of the invention and that the invention is limited only by the scope of the appended claims.

What is claimed is:

1. A signal processing apparatus, comprising:
   means for establishing a telephonic link;
   means for establishing an audio link to an audio transceiver and a keypad;
   means for selecting a message transmission type as either a text or a voice;
   means for converting an audio signal input from the audio link into a text signal, when the message transmission type is selected to be the text;
   means for extracting from the text signal, a destination address delimited by keystrokes when the message transmission type is selected to be the text; and
   means for selectively transmitting over the telephonic link, based on the selected message transmission type, one of the audio signal and at least part of the text signal.

2. The apparatus of claim 1, wherein said telephonic link establishing means establishes the telephonic link to a modem.

3. The signal processing apparatus as in claim 1, further comprising a video display.

4. A signal processing apparatus according to claim 1 wherein the apparatus is connected to the user end of a telephone line.

5. The apparatus of claim 1, wherein said key strokes comprise combinations of # and * key strokes.

6. The apparatus of claim 1, further comprising an audio transceiver connectable to said audio link establishing means.

7. The apparatus of claim 6, wherein said audio transceiver comprises a telephone handset.

8. The apparatus of claim 1, further comprising means for establishing a link to a text input device.

9. The apparatus of claim 8, further comprising a text input device connectable to said text input device connection establishing means.

10. A signal processing apparatus, comprising:
    means for establishing a telephonic link;
    means for establishing an audio link to an audio transceiver and a keypad;
    means for selecting a message transmission type as either a text or a voice;
    means for converting an audio signal input from the audio link into a text signal, when the message transmission type is selected to be the text; and
    means for extracting from the text signal, a destination address, when the message transmission type is selected to be the text;
    wherein said destination address comprises a code corresponding to said destination address, said signal processing apparatus further comprising a look-up table for storing an address corresponding to said code.

11. The signal processing apparatus as in claim 10, further comprising a video display.

12. A signal processing apparatus, comprising:
- means for receiving a speech and data signal over a telephonic link from a remote location, said speech and data signal including a spoken message and an E-mail destination address;
- means for converting said spoken message to a text signal; and
- means for transmitting said text signal over said telephonic link to said E-mail destination address,
- wherein said E-mail destination address is separated from the spoken message by key strokes of a telephone handset.

13. A signal processing apparatus according to claim 12 wherein the apparatus is connected to the user end of a telephone line.

14. The apparatus of claim 12, wherein said key strokes comprise combinations of # and * key strokes.

15. The apparatus of claim 12, wherein said E-mail destination address is in a form of a code corresponding to an address, said signal processing apparatus further comprising a look-up table for storing the address corresponding to said code.

16. A signal processing apparatus, comprising:
- a telephonic link connection unit that establishes a telephonic link;
- an audio transceiver connection unit that establishes an audio link to an audio transceiver;
- a micro controller that selects a message transmission type as either text or voice;
- a signal processor that converts an audio signal input from the audio link into a text signal, when the message transmission type is selected to be the text;
- the micro controller extracting from the text signal, a destination address delimited by keystrokes when the message transmission type is selected to be the text; and
- a transmitter that selectively transmits over the telephonic link, based on the selected message transmission type, one of the audio signal and at least part of the text signal.

17. The apparatus of claim 16, wherein the key strokes comprise combinations of # and * key strokes.

18. The signal processing apparatus according to claim 16, wherein the apparatus is connected to the user end of a telephone line.

19. The apparatus of claim 16, further comprising an audio transceiver connectable to the audio transceiver connection unit.

20. The apparatus of claim 19, wherein the audio transceiver comprises a telephone handset.

21. The apparatus of claim 16, further comprising a text input device connection unit that establishes a link to a text input device.

22. The apparatus of claim 21, further comprising a text input device connectable to the text input device connection unit.

23. The apparatus of claim 16, wherein the telephonic link connection unit establishes the telephonic link to a modem.

24. The signal processing apparatus as in claim 16, further comprising a video display.

25. A signal processing apparatus, comprising:
- a speech receiver that receives a speech and data signal over a telephonic link from a remote location, the speech and data signal including a spoken message and an E-mail destination address;
- a converter that converts the spoken message to a text signal; and
- a transmitter that transmits the text signal over the telephonic link to the E-mail destination address,
- wherein the E-mail destination address is separated from the spoken message by key strokes of a telephone handset.

26. The apparatus of claim 25, wherein the key strokes comprise combinations of # and * key strokes.

27. The apparatus of claim 25, wherein the E-mail destination address is in a form of a code corresponding to an address, the signal processing apparatus further comprising a look-up table for storing the address corresponding to the code.

28. The signal processing apparatus according to claim 25, wherein the apparatus is connected to the user end of a telephone line.

29. A signal processing apparatus, comprising:
- a telephonic link connection unit that establishes a telephonic link;
- an audio transceiver connection unit that establishes an audio link to an audio transceiver;
- a micro controller that selects a message transmission type as either text or voice;
- a signal processor that converts an audio signal input from the audio link into a text signal, when the message transmission type is selected to be the text; and
- the micro controller extracting from the text signal, a destination address, when the message transmission type is selected to be the text;
- wherein the destination address comprises a code corresponding to the destination address, the signal processing apparatus further comprising a look-up table for storing an address corresponding to the code.

30. The signal processing apparatus as in claim 29, further comprising a video display.

* * * * *